(12) United States Patent
Choi

(10) Patent No.: US 7,916,402 B2
(45) Date of Patent: Mar. 29, 2011

(54) IMAGING OPTICAL SYSTEM FOR CAMERA AND VIDEO TELEPHONY CAMERA EMPLOYING THE SAME

(75) Inventor: Byeong-ha Choi, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 367 days.

(21) Appl. No.: 12/283,210

(22) Filed: Sep. 10, 2008

(65) Prior Publication Data
US 2009/0185026 A1  Jul. 23, 2009

(30) Foreign Application Priority Data
Jan. 18, 2008  (KR) .................. 10-2008-0005760

(51) Int. Cl.
*G02B 13/18* (2006.01)
(52) U.S. Cl. ........................ 359/719; 359/718
(58) Field of Classification Search .................. 359/718, 359/719
See application file for complete search history.

(56) References Cited

U.S. PATENT DOCUMENTS
6,297,915 B1  10/2001  Kaneko et al.
6,560,037 B2 *  5/2003  Dou ............................. 359/719

FOREIGN PATENT DOCUMENTS
KR   1020030015130 A   2/2003

* cited by examiner

*Primary Examiner* — Scott J Sugarman
(74) *Attorney, Agent, or Firm* — Drinker Biddle & Reath LLP

(57) ABSTRACT

An imaging optical system for a camera and a video telephony camera employing the imaging optical system. The imaging optical system includes a stop and a first lens that are sequentially arranged from an object side. The first lens has a positive refractive power and two convex aspherical surfaces and satisfies $L_B/f>0.88$ and $L_T/L_B<1.71$ wherein $L_T$ is the distance along the optical axis from the stop to the image plane of the imaging optical system, f is the total focal length of the imaging optical system, and $L_B$ is the distance along the optical axis between the surface of the first lens facing the image side and the image plane of the imaging optical system.

10 Claims, 4 Drawing Sheets

IMAGING OPTICAL SYSTEM FOR CAMERA AND VIDEO TELEPHONY CAMERA EMPLOYING THE SAME

CROSS-REFERENCE TO RELATED PATENT APPLICATION

This application claims the benefit of Korean Patent Application No. 10-2008-0005760, filed on Jan. 18, 2008, in the Korean Intellectual Property Office, the disclosure of which is incorporated herein in its entirety by reference.

BACKGROUND OF THE INVENTION

1. Field of the Invention

The present invention relates to an imaging optical system for a camera and a video telephony camera employing the imaging optical system.

2. Description of the Related Art

Digital or video cameras having solid state imaging sensors such as Charge Coupled devices (CCDs) or Complimentary Metal Oxide Semiconductors (CMOSs) have become popular in recent years. In particular, demands for mega-pixel camera modules are increasing and digital cameras with resolutions of 5 megapixels or more are now commonplace. Optical imaging devices, such as digital cameras or mobile phone cameras using CCDs or CMOSs, are required to be small-sized, lightweight, and inexpensive. Further, to achieve video communication using mobile devices equipped with a camera, the camera should be miniaturized.

Conventionally, 1/7" Video Graphics Array (VGA) camera modules have been widely used as camera modules built into mobile devices for video communication. Now however, 1/11" Common Intermediate Format (CIF) camera modules are coming into mainstream use. Conventional 1/7" VGA camera modules have an angle of view of about 60° that is extremely narrow for video communication and are not suitable for small-sized, lightweight, and low cost applications. 1/7" CIF camera modules have low image quality and severe distortion of over 5% that causes barrel-shaped images. These characteristics are not suitable for satisfactory video communication. In particular, image sensors that become increasingly compact with the miniaturization of mobile devices suffer from shading. In order to correct such shading, there is a need to develop an imaging optical system providing sufficient marginal illumination and high telecentricity.

Further, since an optical system typically includes an infrared (IR) filter between a lens and an imaging sensor, the optical system is required to have a large back focal length (BFL).

SUMMARY OF THE INVENTION

The present invention provides a small-sized imaging optical system for a camera and a video telephony camera employing the imaging optical system.

The present invention also provides an imaging optical system for a camera, which can provide high telecentricity and a large back focal length (BFL), and a video telephony camera employing the imaging optical system.

According to an aspect of the present invention, there is provided an imaging optical system including: a stop and a first lens that are sequentially arranged from an object side wherein the first lens has a positive refractive power and two convex aspherical surfaces and satisfies $L_B/f>0.88$ and $L_T/L_B<1.71$ wherein $L_T$ is the distance along the optical axis from the stop to the image plane of the imaging optical system, f is the total focal length of the imaging optical system, and $L_B$ is the distance along the optical axis between the surface of the first lens facing the image side and the image plane of the imaging optical system.

The imaging optical system may satisfy $0.18 \leq S \leq 0.2$ wherein S denotes the distance along the optical axis between the stop and the surface of the first lens facing the object side.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An imaging optical system for a camera and a video telephony camera employing the imaging optical system according to embodiments of the present invention will now be described more fully with reference to the accompanying drawings, in which the exemplary embodiments of the invention are shown.

Figure 1:
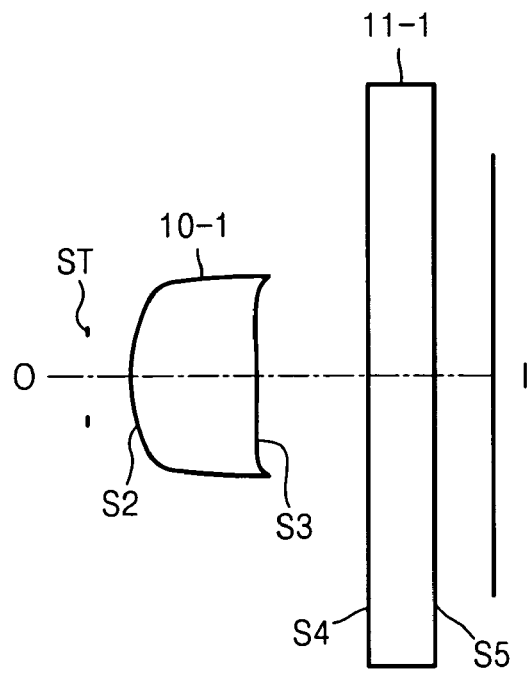
FIG. 1 illustrates an imaging optical system for a video telephony camera, according to an embodiment of the present invention.

Referring to FIG. 1, an imaging optical system for a video telephony camera according to an embodiment of the present invention includes an aperture stop ST and a first lens 10-1 which are sequentially arranged from an object side O. The first lens 10-1 has a positive refractive power and two aspherical surfaces. The first lens 10-1 also has first and second convex surfaces S2 and S3 respectively facing the object side O and the image side I. That is, the first lens 10-1 is a biconvex lens that reduces TV distortion. The imaging optical system further includes an infrared (IR) filter 11-1 disposed on the image side I of the first lens 10-1.

The imaging optical system according to the present embodiment is designed to satisfy the following Inequalities (1) and (2).

$$L_B/f>0.88 \quad (1)$$

$$L_T/L_B<1.71 \quad (2)$$

where $L_T$ is the distance along the optical axis of the imaging optical system from the stop ST to the image plane of the imaging optical system, f is the total focal length of the imaging optical system, and $L_B$ is the distance along the optical axis between the second convex surface S3 of the first lens 10-1 facing the image side I and the image plane of the imaging optical system.

If the imaging optical system satisfies Inequality (1), a large back focal length (BFL) is provided. If the imaging optical system satisfies Inequality (2), the imaging optical system can achieve a compact design. If $L_T/L_B$ exceeds the upper limit of 1.71, the imaging optical system cannot have a compact design because of its increased overall length.

An imaging optical system according to an embodiment of the present invention is required to satisfy Inequality (3) below in order to provide improved telecentricity and compact design:

$$0.18 \leq S \leq 0.2 \quad (3)$$

where S is the distance in mm along the optical axis between the stop ST and the surface S2 of the first lens facing the object side O. If S is greater than 0.2, the imaging optical system can provide telecentricity but cannot achieve a compact design because the entire optical system becomes thicker.

Further, since the stop ST is extremely far from the first lens if S is greater than 0.2, the imaging optical system is susceptible to internal reflection. If S is less than the lower limit of 0.18, the imaging optical system cannot provide telecentricity and has a significant amount of field curvature.

An imaging optical system according to an embodiment of the present invention is designed to satisfy Inequality (4):

$$\left|\frac{R_1}{f}\right| < 0.70 \quad (4)$$

where R1 is the radius of curvature of the surface of the first lens facing the object side and f is the total focal length of the imaging optical system. An imaging optical system that satisfies Inequality (4) provides improved resolution and an angle of view suitable for video telephony.

A first lens in an imaging optical system that satisfies Inequality (5) below has a thickness suitable for high-volume production.

$$0.44 < \frac{t_1}{f} < 0.47 \quad (5)$$

where t1 and f denote the thickness of the first lens and the total focal length of the imaging optical system, respectively.

In embodiments of the present invention, aspherical surfaces are defined as follows.

The shape of the aspherical surfaces S2 and S3 of the zoom lens according to an embodiment of the present invention can be represented by Equation (6) below when the optical axis direction is an x-axis, the direction perpendicular to the optical axis direction is a y-axis, and beams propagate in the positive x direction.

$$x = \frac{cy^2}{1+\sqrt{1-(K+1)c^2h^2}} + Ah^4 + Bh^6 + Ch^8 + Dh^{10} + Eh^{12} + Fh^{14} + Gh^{16} + Hh^{18} \quad (6)$$

where x is the distance from the vertex of the lens in the optical axis direction, Y is the distance in the direction perpendicular to the optical axis, K is a conic constant, A, B, C, D, E and F are aspherical coefficients, and c is a reciprocal (1/R) of the radius of curvature R at the vertex of the lens.

Imaging optical systems with various designs according to embodiments of the present invention include lenses that satisfy conditions optimized to achieve a compact design of the zoom lens.

In the Embodiments below, f is the combined focal length of the entire lens system, Fno is an F number, 2ω is an angle of view, R is a radius of curvature, Dn is a central thickness of the lens or distance between lenses, vd is an Abbe number. ST, OBJ, IMG, and ASP respectively denote a stop, an object plane, an image plane, and an aspherical surface. In the drawings in which the exemplary embodiments are shown, each lens is denoted by a reference number 10 followed by a hyphen and the number of its corresponding embodiment.

EMBODIMENT 1

FIG. 1 illustrates an imaging optical system for a video telephony camera according to Embodiment 1 of the present invention.

| f: 1.2 Fno: 3.2 ω: 33.12 | | | | |
|---|---|---|---|---|
| | R | Dn | nd | vd |
| OBJ: | INFINITY | INFINITY | | |
| ST: | INFINITY | 0.185000 | | |
| S2: | 0.80311 | 0.560000 | 1.519 | 62.1 |
| ASP: | | | | |
| K: −0.184802 | | | | |
| A: −0.911278E+00 | B: 0.659388E+02 | | C: −0.114181E−04 | |
| D: 0.739397E+04 | E: 0.123190E+05 | | F: −0.341265E+06 | |
| G: 0.971385E+06 | H: 0.105746E+06 | | J: 0.364568E+07 | |
| S3: | −2.15862 | 0.548409 | | |
| ASP: | | | | |
| K: −1501.550393 | A: −.218624E+01 | | B: 0.564299E+02 | |
| C: −0.392159E+03 | D: 0.285445E+03 | | E: 0.792600E+04 | |
| F: 0.105250E+05 | G: −0.215591E+06 | | H: −0.602321E+06 | |
| J: 0.449663E+07 | | | | |
| S4: | INFINITY | 0.300000 | 1.516 | 64.2 |
| S5: | INFINITY | 0.167227 | | |
| IMG: | INFINITY | 0.000000 | | |

Figure 2:
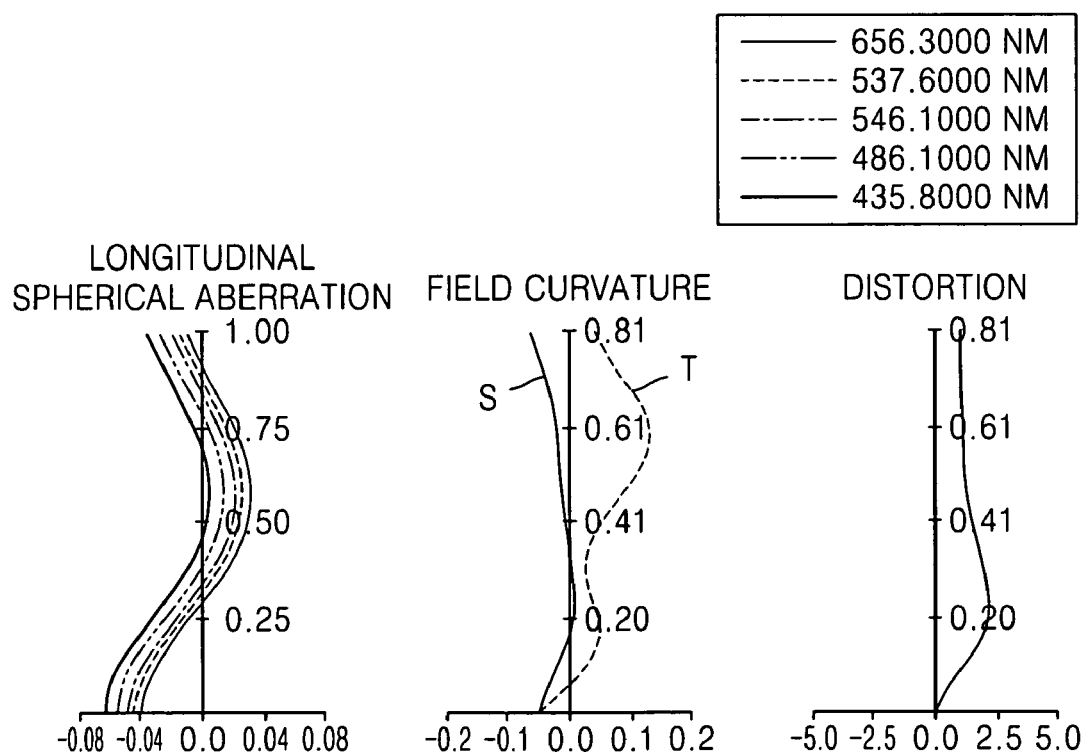
FIG. 2 illustrates spherical aberration, field curvature, and distortion of the imaging optical system of FIG. 1.

FIG. 2 illustrates spherical aberration, field curvature, and distortion of the imaging optical system according to Embodiment 1. Referring to FIG. 2, spherical aberration curves show spherical aberration values for C-line, e-line, and F-line that are respectively 656.3 nm, 546 nm, and 486.1 nm. Field curvature curves S and T in the second diagram respectively show tangential field curvature and sagittal field curvature.

EMBODIMENT 2

Figure 3:
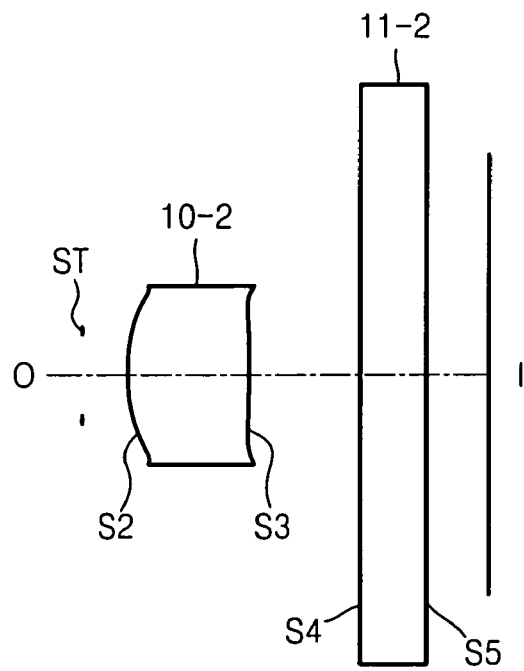
FIG. 3 illustrates an imaging optical system for a video telephony camera, according to another embodiment of the present invention.

FIG. 3 illustrates an imaging optical system for a video telephony camera according to Embodiment 2 of the present invention.

| f: 1.22 Fno: 3.2 ω: 32.68 | | | | |
|---|---|---|---|---|
| | R | Dn | nd | vd |
| OBJ: | INFINITY | 250.000000 | | |
| ST: | INFINITY | 0.200000 | | |
| S2: | 0.80823 | 0.550000 | 1.519 | 62.1 |
| ASP: | | | | |
| K: 0.470962 | | | | |
| A: −0.180076E+00 | B: 0.173976E+02 | | C: −0.180876E+03 | |
| D: 0.568593E+03 | E: −.0132799E+04 | | F: 0.115904E+05 | |

-continued

| f: 1.22 Fno: 3.2 ω: 32.68 | | | |
|---|---|---|---|
| R | Dn | nd | vd |

G: 0.974523E+05   H: 0.198648E+06   J: −.739985E+07
S3:    −2.29397    0.548200
ASP:
K: −1273.835331
A: −0.121126E+01   B: 0.319962E+02   C: −0.154159E+03
D: −0.165218E+03   E: 0.360086E+04   F: 0.717007E+04
G: −0.108718E+06   H: 0.365225E+05   J: 0.926656E+06
S4:    INFINITY    0.300000    1.516    64.2
S5:    INFINITY    0.195639
IMG:   INFINITY    0.000000

Figure 4:
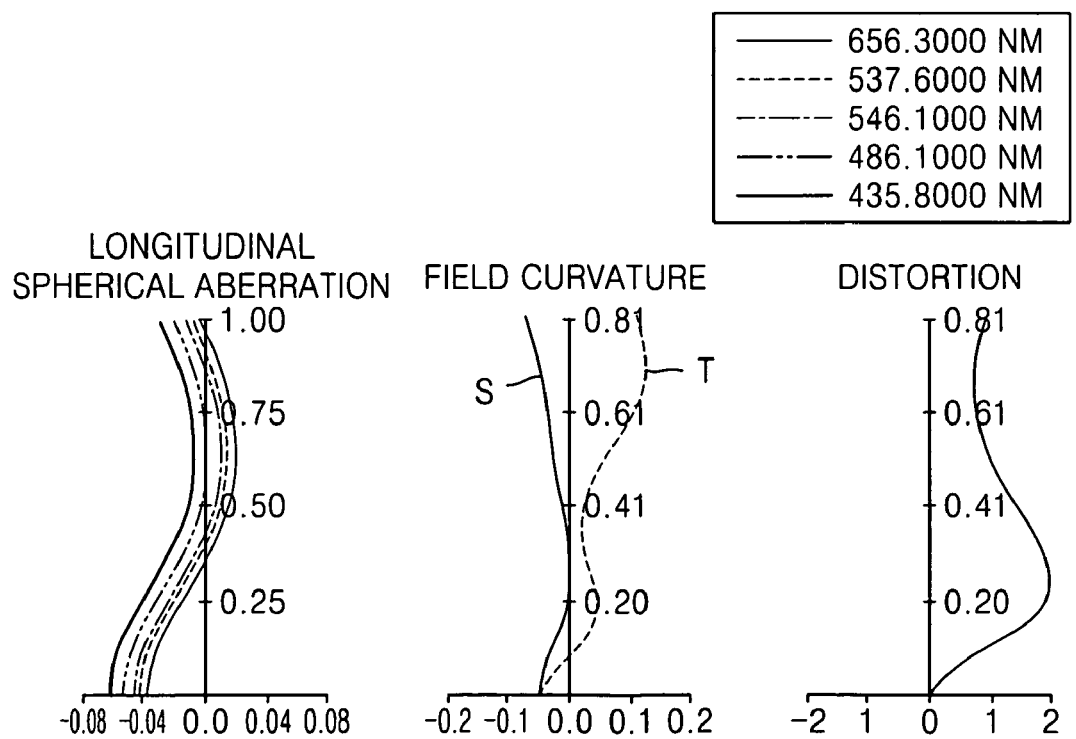
FIG. 4 illustrates spherical aberration, field curvature, and distortion of the imaging optical system of FIG. 3.

FIG. 4 illustrates spherical aberration, field curvature, and distortion of the imaging optical system of Embodiment 2.

EMBODIMENT 3

Figure 5:
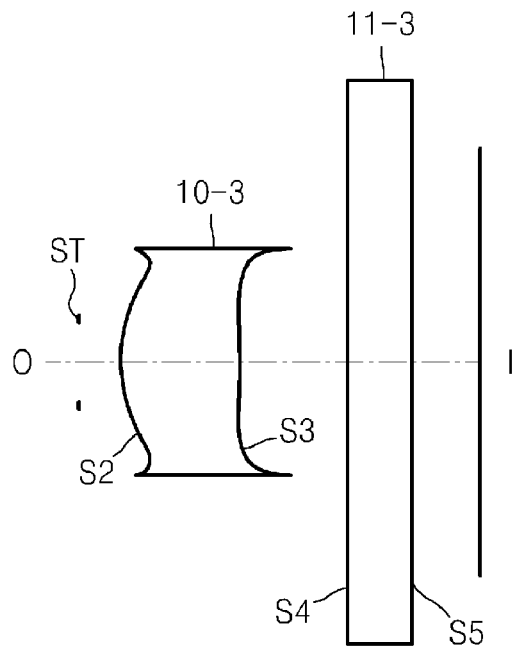
FIG. 5 illustrates an imaging optical system for a video telephony camera, according to another embodiment of the present invention.

FIG. 5 illustrates an imaging optical system for a video telephony camera according to Embodiment 3 of the present invention;

| f: 1.23 Fno: 3.2 ω: 32.66 | | | |
|---|---|---|---|
| R | Dn | nd | vd |

OBJ:   INFINITY    250.000000
ST:    INFINITY    0.200000
S2:    0.84898    0.550000    1.519    62.1
ASP:
K: 0.569636
A: 0.358835E+00   B: 0.440889E+01   C: −0.812760E+02
D: 0.803837E+03   E: −0.396404E+04   F: 0.413812E+04
G: 0.338937E+04   H: 0.372890E+05   J: −.104598E+06
S3:    −2.04249    0.548100
ASP:
K: −835.419925
A: −0.148210E+01   B: 0.338642E+02   C: −0.162500E+03
D: −0.198801E+03   E: 0.367131E+04   F: 0.869016E+04
G: −0.101747E+06   H: 0.322068E+05   J: 0.519856E+06
S4:    INFINITY    0.300000    1.516    64.2
S5:    INFINITY    0.217263
IMG:   INFINITY    0.000000

Figure 6:
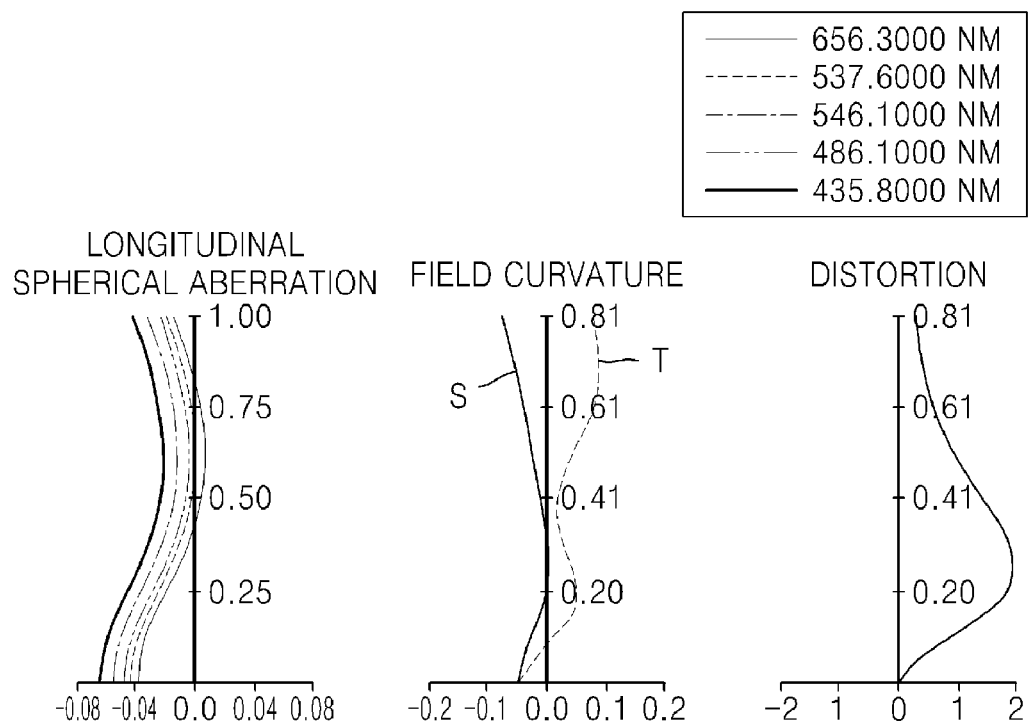
FIG. 6 illustrates spherical aberration, field curvature, and distortion of the imaging optical system of FIG. 5.

FIG. 6 illustrates spherical aberration, field curvature, and distortion of the imaging optical system of Embodiment 3.

EMBODIMENT 4

Figure 7:
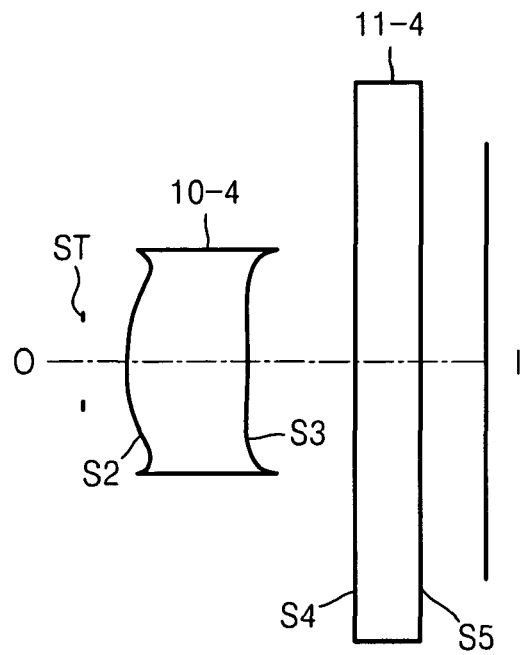
FIG. 7 illustrates an imaging optical system for a video telephony camera, according to another embodiment of the present invention.

FIG. 7 illustrates an imaging optical system for a video telephony camera according to Embodiment 4 of the present invention.

| f: 1.23 Fno: 3.2 ω: 32.72 | | | |
|---|---|---|---|
| R | Dn | nd | vd |

OBJ:   INFINITY    250.000000
ST:    INFINITY    0.200000
S2:    0.82187    0.560000    1.519    62.1
ASP:
K: 0.005043
A: 0.995903E−01   B: 0.768653E+01   C: −0.788286E+02
D: 0.709869E+03   E: −0.398748E+04   F: 0.413812E+04
G: 0.338937E+04   H: 0.372890E+05   J: −.104598E+06
S3:    −2.24120    0.548100

-continued

| f: 1.23 Fno: 3.2 ω: 32.72 | | | |
|---|---|---|---|
| R | Dn | nd | vd |

ASP:
K: −1248.894903
A: −0.150666E+01   B: 0.338400E+02   C: −0.162739E+03
D: −0.193826E+03   E: 0.366124E+04   F: 0.862484E+04
G: −0.101909E+06   H: 0.335610E+05   J: 0.544992E+06
S4:    INFINITY    0.300000    1.516    64.2
S5:    INFINITY    0.203147
IMG:   INFINITY    0.000000

Figure 8:
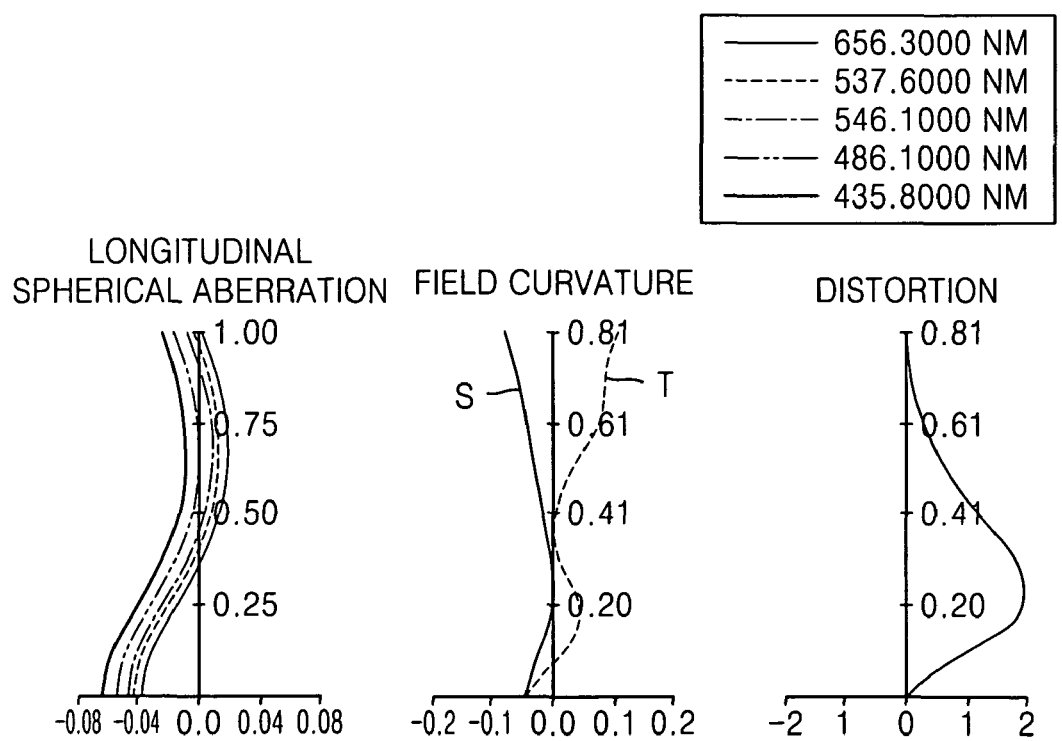
FIG. 8 illustrates spherical aberration, field curvature, and distortion of the imaging optical system of FIG. 7.

FIG. 8 illustrates spherical aberration, field curvature, and distortion of the imaging optical system of FIG. 7.

Table 1 below shows that Embodiments 1 through 4 satisfy Inequalities (1) through (5) above.

TABLE 1

| | Embodiment 1 | Embodiment 2 | Embodiment 3 | Embodiment 4 |
|---|---|---|---|---|
| Inequality 1 | 0.8866 | 0.8949 | 0.9055 | 0.8939 |
| Inequality 2 | 1.7001 | 1.6869 | 1.6733 | 1.6911 |
| Inequality 3 | 0.185 | 0.2 | 0.2 | 0.2 |
| Inequality 4 | 0.6692 | 0.6624 | 0.6902 | 0.6682 |
| Inequality 5 | 0.4666 | 0.4508 | 0.4471 | 0.4552 |

An imaging optical system for a camera according to the present invention can be applicable to a camera using a photographing device and further to a video telephony camera. The imaging optical system has an angle of view of more than 65° suitable for video telephony applications as well as a large BFL suitable for achieving high throughput. The present invention also reduces TV distortions thereby providing improved imaging performance.

While this invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. An imaging optical system for a camera, the system comprising an aperture stop and a first lens that are sequentially arranged from an object side, wherein the first lens has a positive refractive power and two convex aspherical surfaces and satisfies $L_B/f > 0.88$ and $L_T/L_B < 1.71$, wherein $L_T$ is the distance along the optical axis from the stop to the image plane of the imaging optical system, f is the total focal length of the imaging optical system, and $L_B$ is the distance along the optical axis between the surface of the first lens facing the image side and the image plane of the imaging optical system.

2. The system of claim 1, satisfying $0.18 \leq S \leq 0.2$ wherein S denotes the distance along the optical axis between the stop and the surface of the first lens facing the object side.

3. The system of claim 2, satisfying $$\left|\frac{R_1}{f}\right| < 0.70$$

wherein R1 is the radius of curvature of the surface of the first lens facing the object side and f is the total focal length of the imaging optical system.

4. The system of claim 3, satisfying $$0.44 < \frac{t_1}{f} < 0.47$$

wherein t1 denotes the thickness of the first lens.

5. The system of claim 2, satisfying $$0.44 < \frac{t_1}{f} < 0.47$$

wherein t1 and f denote the thickness of the first lens and the total focal length of the imaging optical system, respectively.

6. The system of claim 1, satisfying $$\left|\frac{R_1}{f}\right| < 0.70$$

wherein R1 is the radius of curvature of the surface of the first lens facing the object side and f is the total focal length of the imaging optical system.

7. A video telephony camera comprising an imaging optical system, wherein the imaging optical system comprises a stop and a first lens that are sequentially arranged from an object side, and wherein the first lens has a positive refractive power and two convex aspherical surfaces and satisfies $L_B/f > 0.88$ and $L_T/L_B < 1.71$ wherein $L_T$ is the distance along the optical axis from the stop to the image plane of the imaging optical system, f is the total focal length of the imaging optical system, and $L_B$ is the distance along the optical axis between the surface of the first lens facing the image side and the image plane of the imaging optical system.

8. The camera of claim 7, wherein the imaging optical system satisfies $0.18 \leqq S \leqq 0.2$ wherein S denotes the distance along the optical axis between the stop and the surface of the first lens facing the object side.

9. The camera of claim 7, wherein the imaging optical system satisfies $$\left|\frac{R_1}{f}\right| < 0.70$$

wherein R1 is the radius of curvature of the surface of the first lens facing the object side and f is the total focal length of the imaging optical system.

10. The camera of claim 7, wherein the imaging optical system satisfies $$0.44 < \frac{t_1}{f} < 0.47$$

wherein t1 denotes the thickness of the first lens.

* * * * *